US011734002B2

(12) United States Patent
Chen et al.

(10) Patent No.: US 11,734,002 B2
(45) Date of Patent: Aug. 22, 2023

(54) COUNTING ELEMENTS IN NEURAL NETWORK INPUT DATA (71) Applicant: Shanghai Cambricon Information Technology Co., Ltd., Pudong New Area (CN)

(72) Inventors: Tianshi Chen, Pudong New Area (CN); Jie Wei, Pudong New Area (CN); Tian Zhi, Pudong New Area (CN); Zai Wang, Pudong New Area (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 744 days.

(21) Appl. No.: 16/697,687

(22) Filed: Nov. 27, 2019

(65) Prior Publication Data

US 2020/0097794 A1     Mar. 26, 2020

Related U.S. Application Data (63) Continuation of application No. 16/476,262, filed as application No. PCT/CN2018/083415 on Apr. 17, 2018, now Pat. No. 11,531,540.

(30) Foreign Application Priority Data

Apr. 21, 2017   (CN) .......................... 201811097569.9

(51) Int. Cl.
    *G06F 9/30*       (2018.01)
    *G06N 3/04*       (2023.01)
    (Continued)

(52) U.S. Cl.
    CPC ................. *G06F 9/30* (2013.01); *G06F 7/46* (2013.01); *G06F 9/30007* (2013.01); *G06N 3/04* (2013.01); *G06N 3/08* (2013.01)

(58) Field of Classification Search
    CPC ....................................................... G06F 7/46
    See application file for complete search history.

(56) References Cited

U.S. PATENT DOCUMENTS 9,189,200 B1     11/2015   Langhammer
2005/0257026 A1  11/2005   Meeker
(Continued)

FOREIGN PATENT DOCUMENTS

CN     101038681 A     9/2007
CN     101527010 A     9/2009
(Continued)

OTHER PUBLICATIONS

EP 19 214 320.4, Communication pursuant to Article 94(3), 6 pages.
(Continued)

*Primary Examiner* — Michael D. Yaary
(74) *Attorney, Agent, or Firm* — Getech Law LLC; Jun Ye (57) ABSTRACT The present disclosure provides a counting device and counting method. The device includes a storage unit, a counting unit, and a register unit, where the storage unit may be connected to the counting unit for storing input data to be counted and storing a number of elements satisfying a given condition in the input data after counting; the register unit may be configured to store an address where input data to be counted is stored in the storage unit; and the counting unit may be connected to the register unit, and may be configured to acquire a counting instruction, read a storage address of the input data to be counted in the register unit according to the counting instruction, acquire corresponding input data to be counted in the storage unit, perform statistical counting on a number of elements in the input data to be counted that satisfy the given condition, and obtain a counting result. The counting device and the method may improve the computation efficiency by writing an algorithm of counting a (Continued)

number of elements that satisfy a given condition in input data into an instruction form.

18 Claims, 5 Drawing Sheets

(51) Int. Cl.
  *G06N 3/08* (2023.01)
  *G06F 7/46* (2006.01)

(56) References Cited

U.S. PATENT DOCUMENTS

| | | | |
|---|---|---|---|
| 2009/0019262 A1* | 1/2009 | Tashiro | G06F 9/30065 712/214 |
| 2009/0271465 A1 | 10/2009 | Pistorius et al. | |
| 2011/0055308 A1 | 3/2011 | Mantor et al. | |
| 2014/0164457 A1 | 6/2014 | Chaudhuri | |
| 2014/0208081 A1 | 7/2014 | Yap | |
| 2015/0046671 A1 | 2/2015 | Ould-Ahmed-Vall | |
| 2016/0328647 A1 | 11/2016 | Lin et al. | |
| 2017/0102920 A1 | 4/2017 | Henry et al. | |

FOREIGN PATENT DOCUMENTS

| | | | |
|---|---|---|---|
| CN | 101571796 | A | 11/2009 |
| CN | 101599828 | A | 12/2009 |
| CN | 101685388 | A | 3/2010 |
| CN | 103699360 | A | 4/2014 |
| CN | 104011657 | A | 8/2014 |
| CN | 104699458 | A | 6/2015 |
| CN | 105005911 | A | 10/2015 |
| CN | 105207794 | A | 12/2015 |
| CN | 105359129 | A | 2/2016 |
| CN | 105426160 | A | 3/2016 |
| CN | 105453071 | A | 3/2016 |
| CN | 105512723 | A | 4/2016 |
| CN | 106066783 | A | 11/2016 |
| CN | 106447034 | A | 2/2017 |
| CN | 106528047 | A | 3/2017 |
| EP | 0428942 | A2 | 5/1991 |
| EP | 0428942 | A3 | 5/1991 |

OTHER PUBLICATIONS

EP 19214320.4, European Search Report dated Mar. 24, 2020, 8 pages.
CN 201710264686.9, Official Action dated Apr. 17, 2020, 11 pages. (No English Translation).
CN 201710269106.5, Official Action dated Mar. 26, 2020, 11 pages. (No English Translation).
CN 201811097653.0, Official Action dated Apr. 30, 2020, 8 pages, (No English Translation).
Article 296-302 "Binary Number Multiplier" 2020, 19 pages (11 pages of Translation, 8 pages of Article).
PCT/CN2018/083415—International Search Report, dated Jul. 20, 2018, 10 pages, (no English translation).
JP 2019-549467 Notice of Reason for Refusal, dated Jan. 19, 2021, 14 pages, (with English translation).
CN 201710264686.9—Second Office Action, dated Dec. 23, 2020, 10 pages. (no English translation).
CN 201710264686.9—Third Office Action, dated Mar. 18, 2021, 12 pages. (no English translation).
Xu Jianbang, et.al, "National Defense Industry Press", DSP Algorithm and Architecture Realization Technology, Jan. 31, 2010, 4 pages. (no English translation).
CN 201710256445.X—First Office Action, dated Sep. 25, 2020, 10 pages (no English translation).
Tao Wang, et al., "The Study and Realization of Instruction Folding in Java Processor", Computer Research and Development, vol. 37 No. 1, Jan. 31, 2000, 5 pages. (with English abstract).
Yigang Zhang, "Harbin Institute of Technology Press" MCS-51 Singer Chip Microcomputer Application Design, 2nd Edition, Dec. 31, 1997, 3 pages. (no English translation).
CN 201710269049.0—First Office Action, dated May 15, 2020, 7 pages. (no English translation).
CN 201710269106.5—Second Office Action, dated Nov. 3, 2020, 5 pages. (no English translation).
CN 201711468817.1—First Office Action, dated Dec. 8, 2020, 8 pages. (no English translation).
CN 201811097569.9—First Office Action, dated Aug. 3, 2020, 11 pages. (no English translation).
EP 18788355.8—Extended European Search Report, dated Jan. 22, 2021, 8 pages.
EP 18788355.8—Response to the Communication under Rules 161 and 162 EPC dated Nov. 26, 2019, filed Feb. 4, 2020, 18 pages.
Taesik NA, et al., "Speeding Up Convolutional Neural Network Training with Dynamic precision Scaling and Flexible Multiplier-Accumulator", ISLPED, Aug. 2016, 6 pages.
KR 10-2019-7025307—Response to Office Action, filed Feb. 9, 2021, 22 pages. (no English translation).
KR 10-2019-7025307—Office Action, dated Dec. 28, 2020, 3 pages. (no English translation).
JP 2019-228383—First Office Action, 2019, 5 pages. (no English translation).
EP 19214371.7—Extended European Search Report, dated Jan. 25, 2021, 9 pages.
CN201880000923.3—Office Action dated Mar. 31, 2023, 25 pages. (With Brief English Explanation).

\* cited by examiner

COUNTING ELEMENTS IN NEURAL NETWORK INPUT DATA

TECHNICAL FIELD

The present disclosure relates to the field of computer, and further relates to a counting device and a counting method.

BACKGROUND

In the current computer field, many algorithms require counting of a number of elements in input data that satisfy a given condition (e.g., calculation of a count of 1 in the 0/1 vector). Taking artificial neural network algorithms as an instance, a sparse matrix is usually used in neural network algorithms to reduce computation, where sparsity of the matrix is determined by counting a number of non-zero elements in a vector.

Current general-purpose processors have no instruction for counting a number of elements, and compiling is often needed to realize the counting, which may involve a large number of codes and cause low efficiency. In addition, the compiling may be confined by problems such as chip-to-chip communication, shortage of on-chip cache, and support for data length being inflexibility.

SUMMARY

(I) Technical Problem to be Solved

The present disclosure provides a counting device and a counting method to overcome at least one of the above-mentioned problems.

(II) Technical Solutions

The present disclosure provides a counting device including: a register unit, a counting unit, and a storage unit. The register unit may be configured to store an address where input data to be counted is stored in the storage unit; the counting unit may be connected to the register unit, and may be configured to acquire a counting instruction, read a storage address of the input data in the register unit according to the counting instruction, acquire corresponding input data to be counted in the storage unit, and perform statistical counting on a number of elements in the input data that satisfy a given condition, to obtain a counting result; the storage unit may be connected to the counting unit and may be configured to store the input data to be counted and store the counting result.

The present disclosure also provides a counting method of the aforesaid counting device including the following steps: acquiring, by the counting unit, a counting instruction; reading an address of input data from the register unit according to the counting instruction; acquiring corresponding input data to be counted from the storage unit; performing statistical counting on a number of elements in the input data that satisfy a given condition, to obtain a counting result; and transmitting the statistical counting result to the storage unit.

(III) Technical Effects

The counting device and the method provided by the present disclosure may improve the computation efficiency by writing an algorithm of counting a number of elements that satisfy a given condition in input data into an instruction form.

DETAILED DESCRIPTION

The technical solutions in the examples of the present disclosure are clearly and completely described below with reference to the drawings in the examples of the present disclosure. Apparently, the described examples are only a part of the examples of the present disclosure, rather than all of the examples. All other examples obtained by a person of ordinary skill in the art based on the examples of the present disclosure without creative efforts are within the scope of the present disclosure.

The "memory" described in the present disclosure may be integrated within a processing device with dynamically configurable computation bit width, or may be a separate device, as an external memory for data transmission with a processing device with dynamically configurable computation bit width.

The present disclosure provides a counting device and a counting method for supporting counting instructions. By writing an algorithm of counting a number of elements that satisfy a given condition in input data (data to be counted) into an instruction form, the computation efficiency may be improved. This will be specifically explained in combination with specific examples below.

Figure 1:
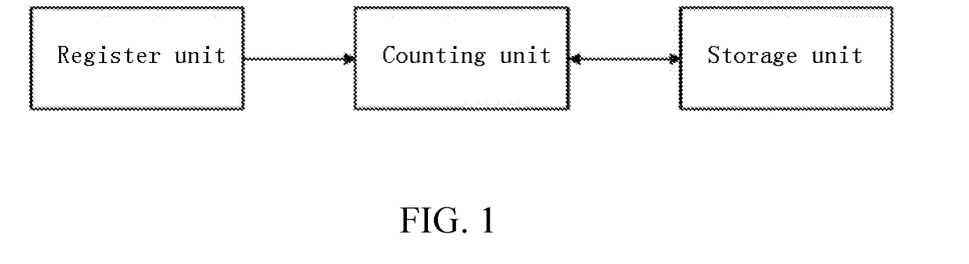
FIG. 1 is a structural schematic diagram of a framework of a counting device according to an example of the present disclosure.

An exemplary example of the present disclosure provides a counting device supporting a counting instruction. FIG. 1 is a schematic diagram of a framework of a counting device according to the example of the present disclosure. As shown in FIG. 1, the counting device supporting a counting instruction according to the present disclosure may include: a storage unit, a counting unit, and a register unit. The storage unit may be connected to the counting unit, and may be configured to store input data to be counted and to store a number of elements satisfying a given condition in the input data after counting (counting result), and the storage unit may be main storage, or may be temporary storage and furthermore may be a cache. By temporarily storing the input data to be counted on the cache, the counting instruction can flexibly and efficiently support data of different widths, which may thereby improve execution performance.

In one example, the storage unit may be a cache, which can support input data of different bit widths and/or input data occupying storage spaces of different sizes, and temporarily store input data to be counted in the cache, so that a counting process can flexibly and effectively support data of different widths. The counting unit may be connected to the register unit, and the counting unit may be configured to acquire a counting instruction, read an address of input data in the register unit according to the counting instruction, and then acquire corresponding input data to be counted in the storage unit according to the address of the input data, and statistically count a number of elements in the input data that satisfy a given condition to obtain a final counting result, and the counting result is stored in the storage unit. The register unit may be configured to store an address of input data to be counted as stored in the storage unit. In one example, an address stored by the register unit may be an address of input data to be counted as on the cache.

In some examples, a data type of input data to be counted may be a 0/1 vector, or may be a numeric vector or a matrix. When a number of elements in the input data satisfying a given condition is counted, the condition to be satisfied by the counted element may be being the same as a given element. For instance, to count a number of elements x contained in a vector A, x may be a number n, where n=0, 1, 2 . . . ; x can also be a vector m, for instance m=00, 01, 11 . . . . The condition to be satisfied by the counted element may also be satisfying a given expression. For instance, to count a number of elements in a vector B that are greater than a value y, where y may be an integer n, n=0, 1, 2 . . . , and y may also be a floating point number f, f=0.5, 0.6 . . . ; for instance, to count a number of elements in a vector C that can be exactly divided by z, where z may be an integer n, n=0, 1, 2 . . . .

Figure 2:
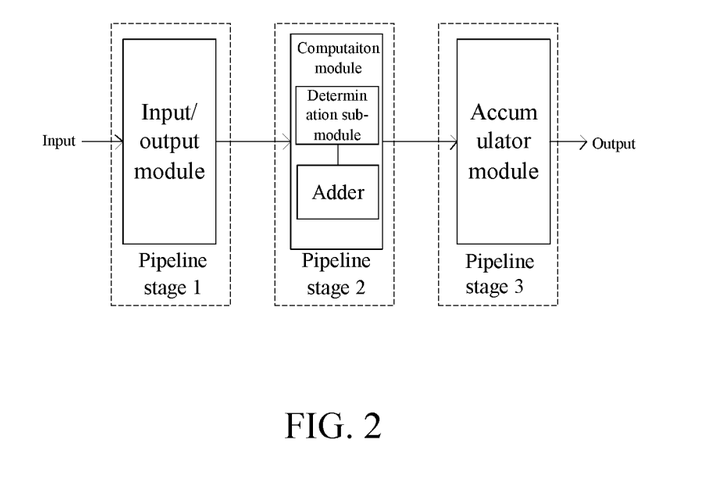
FIG. 2 is a structural schematic diagram of a counting unit in a counting device according to an example of the present disclosure.

FIG. 2 is a schematic diagram of a counting unit in a counting device according to an example of the present disclosure. As shown in FIG. 2, the counting unit may include an input/output module, a computation module, and an accumulator module.

The input/output module may be connected to the computation module, and each time may take a piece of data of a set length (the length can be configured according to actual requirements) of input data to be counted in the storage unit, and input the piece of data to the computation module to undergo computation; after the computation module completes the computation, the input/output module may continue to take a next piece of data of the fixed length until all elements of the input data to be counted are taken; the input/output module may output a counting result computed by the accumulator module to the storage unit.

The computation module may be connected to the accumulator module. With a fixed length of data input, the number of respective elements of the input data satisfying the given condition may be added by an adder of the computation module, and the obtained result may be output to the accumulator module. The computation module may further include a determination sub-module for determining whether the input data satisfies a given condition (the given condition may be being the same as a given element, or a value being within a set interval). If the condition is satisfied, outputting 1, if the condition is not satisfied, outputting 0, and then sending the output to the adder to undergo accumulation.

In an example, a structure of the adder may include n layers, where: a first layer may have 1 full adders, a second layer may have $\lceil 2 \ 1/3 \rceil$ full adders, . . . a $m^{th}$ layer may have $\lceil 2^{m-1}1/3^{m-1} \rceil$ full adders; where l, m, n are integers greater than 1, m is an integer greater than 1 and less than n, and $\lceil x \rceil$ represents that data x is subjected to a ceiling operation. The specific process is described below. It is assumed that the input data type is a 0/1 vector, and a number of 1 in the 0/1 vector to be counted. Assuming a fixed length of the 0/1 vector is 3 l, where l is an integer greater than 1. The first layer of the adder has l full adders; the second layer of the adder has $\lceil 2 \ 1/3 \rceil$ full adders, where each full adder has 3 inputs and 2 outputs, then the first layer gets a total of 4 1/3 outputs. According to this method, the full adders in each layer have 3 inputs and 2 outputs, and the adders of the same layer can be executed in parallel; if a number of an i-th data is 1 during the computation, it may be output as the i-th bit of a final result, in other words, a number of 1 in the 0/1 vector of this part.

Figure 3:
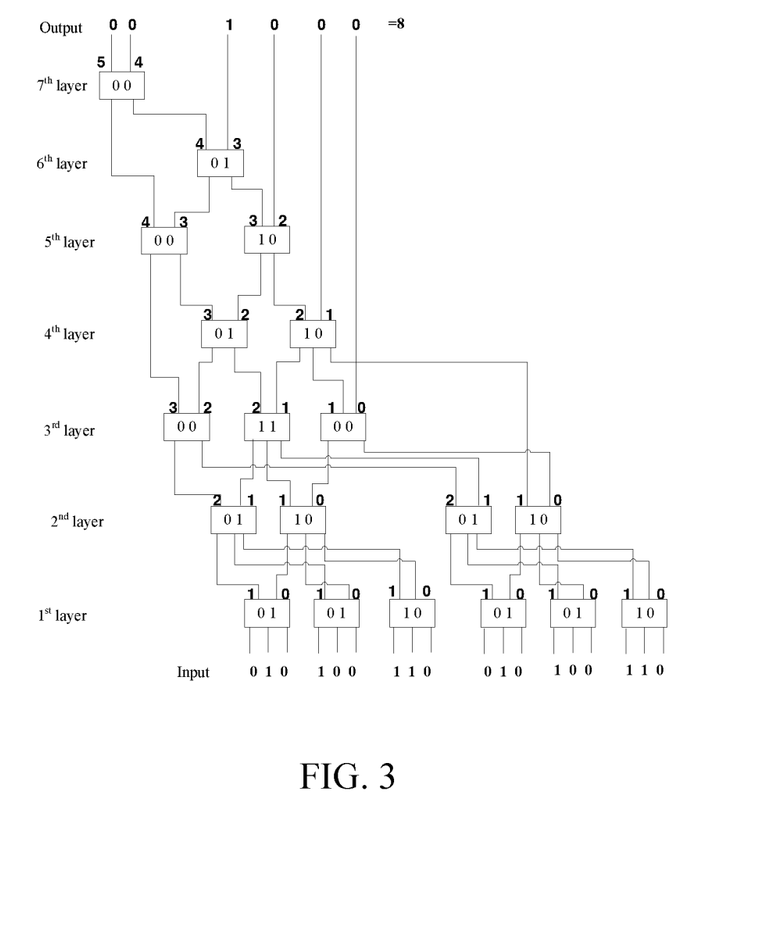
FIG. 3 is a structural schematic diagram of an adder in the counting unit in FIG. 2.

FIG. 3 is a schematic diagram of a specific full adder, where an adder structure may include 7 layers (in other words, n is 7); a first layer may have 6 full adders, and a piece of fixed length 0/1 vector may have a length of 18 (in other words, l is 6), where the full adders of each layer can operate in parallel, for instance, a $3^{rd}$ layer may have $\lceil 2^{m-1}1/3^{m-1} \rceil=3$ (in other words, m is 3, l is 6) full adders; when the input data is (0,1,0), (1,0,0), (1,1, 0), (0, 1, 0), (1, 0, 0), (1, 1, 0), by counting with the full adders of the example of the present disclosure, the result may be (001000), in other words, 8. The aforesaid adders may increase the parallelism of the addition computation and effectively improve the computation speed of the computation module.

The accumulator module may further be connected to the input/output module, and accumulate a result output from the computation module until no new input exists.

The counting unit may be a multi-stage pipeline structure, where operation of reading a vector in the input/output module may be at a first pipeline stage, the computation module may be at a second pipeline stage, and the accumulator module may be at a third pipeline stage. These units may be at different pipeline stages and can more efficiently implement operation required by a counting instruction.

Figure 4:
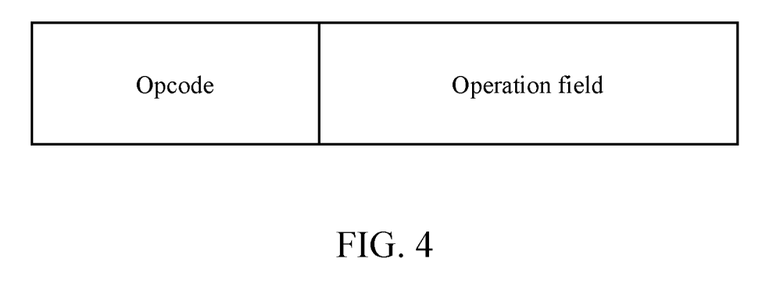
FIG. 4 is a diagram showing a format of an instruction set of a counting instruction in a counting device according to an example of the present disclosure.

FIG. 4 is a diagram showing a format of an instruction set of a counting instruction in a counting device according to an example of the present disclosure. As shown in FIG. 4, the counting instruction may include an opcode and one or more operation fields, where the opcode may be used to indicate that the instruction is a counting instruction, and the counting unit can perform a counting computation by identifying the opcode; the operation fields may include address information for indicating input data to be counted in the counting instruction, and it may further include address information of a determination condition. The address information may be an immediate operand or a register number. For instance, to obtain a vector, a vector start address and a vector length may be obtained in a corresponding register according to the register number, and then a vector stored in a corresponding address in the storage unit may be acquired according to the vector start address and the vector length. Instructions adopted by the example of the present disclosure have a compact format, so that the instruction set may be convenient to use and can support data of flexible length.

Figure 5:
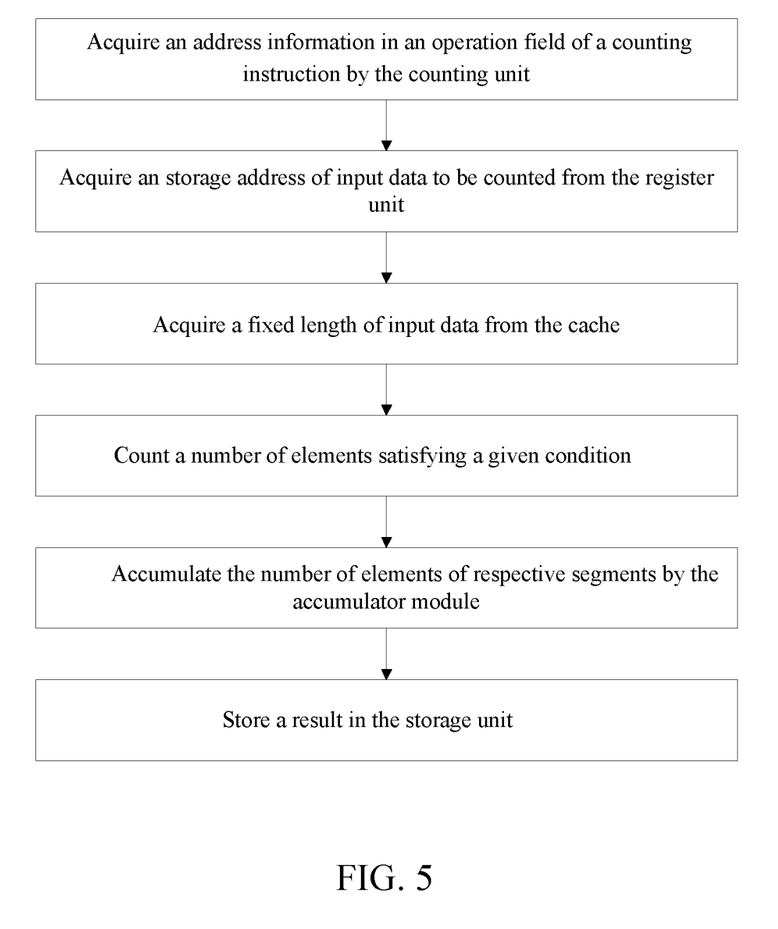
FIG. 5 is a flowchart of an execution process of a counting unit in a counting device according to an example of the present disclosure.

FIG. 5 is a flowchart of an execution process of a counting unit in a counting device according to an example of the present disclosure. As shown in FIG. 5, during operation, the counting unit may acquire an address of input data to be counted in the register unit according to address information in an operation field of a counting instruction, and then acquire the input data to be counted in the storage unit according to the address. The input data to be counted may be stored in a cache, each time the counting unit may acquire a fixed length of input data from the cache, and a determination sub-module may determine whether an element satisfies a given condition, and then an adder may be used to count a number of elements satisfying a given condition in this part of input data, and the number of elements satisfying the given condition in each part of data may be accumulated by the accumulator module to obtain a final counting result, which may be stored in the storage unit.

Figure 6:
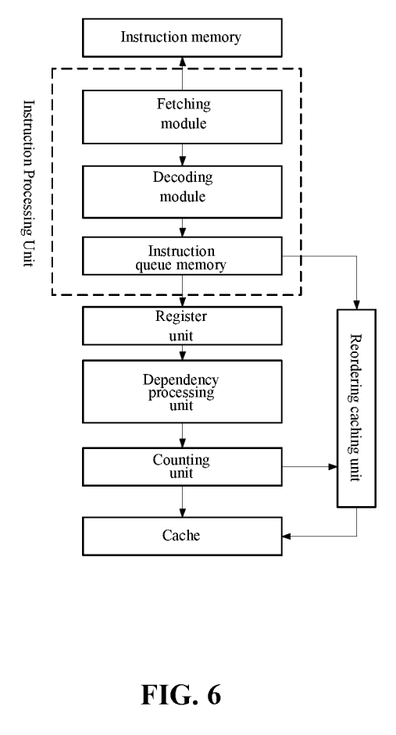
FIG. 6 is a structural schematic diagram of a counting device according to an example of the present disclosure.

FIG. 6 is a schematic diagram of a detailed structure of a counting device according to an example of the present disclosure. As shown in FIG. 6, in the present disclosure, the device supporting a counting instruction may further include: an instruction memory, an instruction processing unit, an instruction caching unit (cache, buffer, or scratch pad), and a dependency processing unit.

The instruction processing unit may be configured to acquire a counting instruction from the instruction memory, process the counting instruction, and provide the processed instruction to the instruction caching unit and the dependency processing unit. The instruction processing unit may include: an instruction fetching module and a decoding module. The fetching module may be connected to the instruction memory for acquiring a counting instruction from the instruction memory; the decoding module may be connected to the fetching module for decoding the obtained counting instruction. In addition, the instruction processing unit may further include an instruction queue memory, which may be connected to the decoding module for sequentially storing the decoded counting instruction, and sequentially transmitting the instructions to the instruction caching unit and the dependency processing unit. Considering a limited number of instructions that can be accommodated by the instruction caching unit and the dependency processing unit, instructions in the instruction queue memory can be sequentially transmitted only when the instruction caching unit and dependency processing unit have free capacity.

The instruction caching unit may be connected to the instruction processing unit for sequentially storing counting instructions to be executed. The counting instructions may also be cached in the instruction caching unit during execution. After the execution of an instruction is completed, an instruction execution result (counting result) may be transmitted to the instruction caching unit; if the instruction is also an earliest instruction among uncommitted instructions in the instruction caching unit, the instruction may be committed, and an instruction execution result (counting result) may be written back to the cache together. In one example, the instruction caching unit may be a reordering caching unit.

The dependency processing unit may be connected to the instruction queue memory and the counting unit for determining whether a vector required for a counting instruction (in other words, a vector to be counted) is up-to-date before the counting unit acquires the counting instruction, and if the counting instruction is up-to-date, the counting instruction may be directly provided to the counting unit; if the counting instruction is not up-to-date, the counting instruction may be stored in a storage queue of the dependency processing unit, and after the required vector is updated, the counting instruction in the storage queue may be provided to the counting unit. Specifically, when the counting instruction accesses the cache, the storage space may be waiting for the writing of a previous instruction; in order to ensure the correctness of the execution result of the instruction, if the current instruction is detected to have a dependency on data of the previous instruction, the instruction must wait in the storage queue until the dependency is removed. The dependency processing unit may enable instructions to be executed out of order and sequentially committed, which may effectively reduce pipeline blocking and enable precise exceptions.

The fetching module may be configured to fetch a next instruction to be executed from the instruction memory and transmit the instruction to the decoding module; the decoding module may be configured to decode the instruction and transmit the decoded instruction to the instruction queue memory; the instruction queue memory may be configured to cache the decoded instruction, and send the instruction to the instruction caching unit and the dependency processing unit when the instruction caching unit and the dependency processing unit have free capacity; during a process that the counting instruction is sent from the instruction queue memory to the dependency processing unit, the counting instruction may read an address of input data in the storage unit from the register unit; the dependency processing unit may be configured to process a possible data dependent relationship between a current instruction and a previous instruction, and the counting instruction may access the storage unit, and other previously executed instructions may access the same block of storage. In order to ensure the correctness of an execution result of an instruction, if the current instruction is detected to have a dependency on data of the previous instruction, the instruction must wait in the storage queue until the dependency is removed. The counting unit my acquire a counting instruction from the dependency processing unit, acquire corresponding input data to be counted in the storage unit according to the address of the input data read from the register unit by the counting instruction, and count a number of elements satisfying a given condition in the input data, and transmit a counting result to the instruction caching unit. A final counting result and this counting instruction may be written back to the storage unit.

Figure 7:
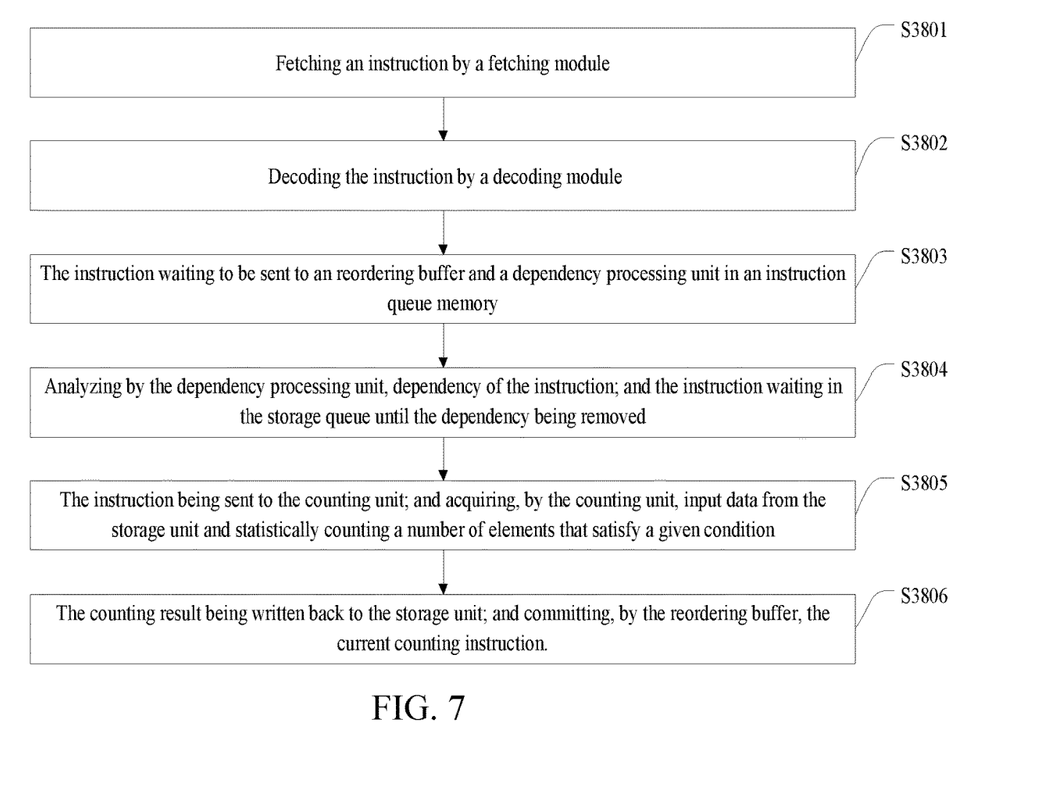
FIG. 7 is a flowchart of an execution process of a counting device according to an example of the present disclosure.

FIG. 7 is a flowchart of an execution process of a counting device according to an example of the present disclosure. As shown in FIG. 7, the process of executing a counting instruction may include:

S3801: fetching, by a fetching module, a counting instruction from an instruction memory, and sending the counting instruction to a decoding module.

S3802: decoding the counting instruction, by the decoding module, and sending the counting instruction to an instruction queue memory.

S3803: waiting, by the counting instruction in the instruction queue memory, and being sent to an instruction caching unit and a dependency processing unit when the instruction caching unit and the dependency processing unit have free capacity.

S3804: during a process that the counting instruction is sent from the instruction queue memory to the dependency processing unit, reading, by the counting instruction, an address of input data in a storage unit from a register unit; analyzing, by the dependency processing unit, whether the instruction has a data dependency with a previous instruction of which the execution has not been finished; the counting instruction may need to wait in a storage queue of the dependency processing unit until there is no dependency in data between the current instruction and a previous instruction of which the execution has not been finished.

S3805: after the dependency no longer exists, the current counting instruction being sending to the counting unit. Acquiring, by the counting unit, input data from the storage unit according to the storage address, and statistically counting a number of elements in the input data that satisfy a given condition.

S3806: after the counting is completed, a counting result being written back to the storage unit by the instruction caching unit; and committing, by the instruction caching unit, the current counting instruction to the storage unit.

So far, the present example has been described in detail with reference to the drawings. Based on the above description, persons skilled in the art should have a clear understanding of the counting device supporting a counting instruction and the counting method of the counting device in the examples of the present disclosure.

Some examples further disclose a chip, which may include the aforesaid processing device.

Some examples further disclose a chip package structure, which may include the aforesaid chip.

Some examples further disclose a board card, which may include the aforesaid chip package structure.

An example further discloses electronic apparatus, which may include the aforesaid board card.

The electronic apparatus may include, but is not limited to, robots, computers, printers, scanners, tablets, smart terminals, mobile phones, driving recorders, navigators, sensors, webcams, cloud servers, cameras, video cameras, projectors, watches, headphones, mobile storage, wearable apparatuses, vehicles, household appliances, and/or medical equipment.

The vehicles may include airplanes, ships, and/or cars; the household appliances may include televisions, air conditioners, microwave ovens, refrigerators, rice cookers, humidifiers, washing machines, electric lamps, gas stoves, and range hoods; the medical equipment may include nuclear magnetic resonance instruments, B-ultrasound instruments, and/or electrocardiographs.

In the examples provided by the present disclosure, it should be understood that the related device and method disclosed may be implemented in other manners. For instance, the device examples described above are merely illustrative. For instance, the division of the part or module is only a logical function division. In actual implementation, there may be another division manner, for instance, multiple parts or modules may be combined or may be integrated into one system, or some features can be ignored or not executed.

In the present disclosure, the term "and/or" may have been used. As used herein, the term "and/or" means one or the other or both (e.g., the phrase "A and/or B" means "A or B", or "both A and B").

In the above description, for purposes of explanation, numerous specific details are set forth in order to provide a thorough understanding of various examples of the present disclosure. However, it will be obvious for a person skilled in the art that one or more other examples can also be implemented without some of these specific details. The specific examples described are not intended to limit the present disclosure but to illustrate it. The scope of the present disclosure is not to be determined by the specific examples provided above but only by the following claims. In other instances, known circuits, structures, apparatuses, and operations are shown not in detail but in block diagrams so as not to obscure the understanding of the description. Where deemed appropriate, the reference numerals or the end portions of the reference numerals are repeated among the drawings to indicate corresponding or similar elements optionally having similar characteristics or the same features, unless specified or obvious otherwise.

Various operations and methods have been described. Some methods have been described by way of flow chart in a relatively basic manner, but these operations can optionally be added to and/or removed from these methods. In addition, although the flowchart shows specific sequences of operations according to various exemplary examples, it is to be understood that the specific sequences are exemplary. Alternative examples may optionally perform these operations in different ways, combine certain operations, interlace some operations, etc. The modules, features, and specific optional details of the devices described herein may also optionally be applied to the methods described herein. In various examples, these methods may be executed by and/or executed within such devices.

In the present disclosure, respective functional parts/units/sub-units/modules/sub-modules/means may be hardware. For instance, the hardware may be a circuit including a digital circuit, an analog circuit, and the like. Physical implementation of hardware structures may include, but is not limited to, physical devices, and the physical devices may include but are not limited to transistors, memristors, and the like. The computation module in the computation device may be any suitable hardware processor such as a CPU, GPU, FPGA, DSP, ASIC, etc. The storage unit may be any suitable magnetic storage medium or magneto-optical storage medium such as RRAM, DRAM, SRAM, EDRAM, HBM, HMC, etc.

Persons skilled in the art can clearly understand that for convenience and conciseness of description, the division of the above-mentioned functional modules is illustrated only as instances, and in practical application, the above-mentioned functions can be assigned to different functional modules to complete according to the needs. In other words, the internal structure of the device can be divided into different functional modules to complete all or a part of the functions described above.

The specific examples described above further explain the purpose, technical solution, and technical effects of the present disclosure in detail. It should be understood that the above description only relates to specific examples of the present disclosure and is not intended to limit the present disclosure, and any modifications, equivalent substitutions, improvements, etc. made within the spirit and principles of the present disclosure should all be included within the scope of protection of the present disclosure.

What is claimed is:

1. A counting device, comprising:
    a storage circuit configured to store input data to be counted and store a count of elements in the input data that satisfy a given condition after counting;
    a register circuit is configured to store an address in the storage circuit where the input data to be counted is stored; and
    a counting circuit connected to the register circuit and the storage circuit wherein the counting circuit is configured to:
        acquire a counting instruction,
        read a storage address of the input data in the register circuit according to the counting instruction,
        acquire corresponding input data to be counted in the storage circuit,
        identifying elements in the input data that satisfy the given condition, and
        obtain a counting result,
    wherein the counting circuit includes: an input/output circuit, a computation circuit, and an accumulator circuit,
    wherein the input/output circuit is connected to the computation circuit and is configured to retrieve a portion of data of a set length from the input data to be counted, and transmitting the portion of data to the computation circuit,
wherein the computation circuit includes an adder configured to add a number of respective elements in the portion of data of the set length that satisfy the given condition, and output an obtained result to the accumulator circuit, and
wherein the accumulator circuit is configured to accumulate the result obtained by the computation circuit.

2. The counting device of claim 1, wherein the storage circuit is main storage, and/or a cache.

3. The counting device of claim 1, wherein, the given condition includes:
at least one element in the portion of data of the set length is the same as a given element, or
at least one element in the portion data of the set length are within a set range.

4. The counting device of claim 1, wherein the computation circuit further includes:
a determination sub-module configured to
determine whether at least one element in the portion of data of the set length satisfies the given condition,
output 1 based on a determination that at least one element in the portion of data satisfies the condition, and
output 0 based on a determination that no element in the portion of data satisfies the condition, and
send one or more values output as 1 to the adder for accumulation.

5. The counting device of claim 1, wherein a structure of the adder includes n layers, wherein: a first layer includes l full adders, a second layer includes $\lceil 2l/3 \rceil$ full adders, . . . a $m^{th}$ layer includes $\lceil 2^{m-1}/3^{m-1} \rceil$ full adders, wherein l, m, and n are integers greater than 1, m is an integer greater than 1 and less than n, and $\lceil x \rceil$ represents that data x is subjected to a ceiling operation.

6. The counting device of claim 1,
wherein the counting circuit is structured as a multi-stage pipeline,
wherein operations of reading a vector in the input/output circuit are performed at a first pipeline stage, the computation circuit is at a second pipeline stage, and the accumulator circuit is at a third pipeline stage.

7. The counting device of claim 1,
wherein the counting instruction includes an opcode and one or more operation fields,
wherein the opcode indicates that the instruction is a counting instruction, and the counting circuit performs a counting computation in accordance with the opcode; and
wherein the operation fields include address information in the counting instruction for the input data to be counted, and/or address information of the given condition.

8. The counting device of claim 1, further comprising:
an instruction memory configured to store a counting instruction;
an instruction processing circuit connected to the instruction memory for acquiring the counting instruction from the instruction memory, and processing the counting instruction;
an instruction caching circuit (cache, buffer, or scratch pad) connected to the instruction processing circuit for sequentially storing counting instructions to be executed and in execution, and the instruction caching circuit is further connected to the counting circuit and the storage circuit for submitting a counting instruction after being executed and a counting result to the storage circuit; and
a dependency processing circuit connected to the instruction processing circuit for determining whether input data required for a counting instruction is up-to-date before the counting circuit acquires the counting instruction, and if the counting instruction is up-to-date, providing the counting instruction to the counting circuit directly, if the counting instruction is not up-to-date, storing the counting instruction in a storage queue of the dependency processing circuit, and after the required input data is updated, providing the counting instruction in the storage queue to the counting circuit,
wherein during a process that the counting instruction is sent from the instruction processing circuit to the dependency processing circuit, the counting instruction reads an address of the input data in the storage circuit from the register circuit.

9. The counting device of claim 8, wherein, the instruction processing circuit includes:
an instruction fetching circuit connected to the instruction memory for acquiring a counting instruction from the instruction memory,
a decoding circuit connected to the fetching circuit for decoding the obtained counting instruction, and
an instruction queue memory for sequentially storing a decoded counting instruction, and sequentially transmitting instructions to the instruction caching circuit and the dependency processing circuit.

10. The counting device of claim 9, wherein the instruction caching circuit is a reordering caching circuit.

11. The counting device of claim 1, wherein a data type of the input data to be counted is a 0/1 vector, a numeric vector, or a matrix.

12. A counting method, comprising:
storing, by a storage circuit, input data to be counted and a count of elements in the input data that satisfy a given condition after counting;
storing, by a register circuit, an address in the storage circuit where the input data is stored;
acquiring, by a counting circuit, a counting instruction;
reading, by the counting circuit, a storage address of the input data to be counted in the register circuit according to the counting instruction;
acquiring, by the counting circuit, corresponding input data to be counted in the storage circuit;
identifying, by the counting circuit, elements in the input data that satisfy the given condition; and
obtaining a counting result,
wherein, the reading the storage address of the input data to be counted in the register circuit according to the counting instruction, acquiring corresponding input data to be counted in the storage circuit, and performing statistical counting on a number of elements in the input data to be counted that satisfy the given condition includes:
retrieving, by the input/output circuit, a portion of data of a set length of the input data in the storage circuit;
transmitting, by the input/output circuit, the portion of data to the computation circuit,
adding, by an adder of the computation circuit, a number of respective elements in the portion of data of the set length that satisfy the given condition;
transmitting an obtained result to the accumulator circuit; and accumulating, by the accumulator circuit, the result obtained by the computation circuit.

13. The counting method of claim 12, wherein the storage circuit is main storage, and/or a cache.

14. The counting method of claim 12, further comprising:
determining, by a determination sub-module of the computation circuit, whether the portion of data of the set length satisfies the given condition;
outputting 1 based on a determination that at least one element in the portion of data satisfies the given condition;
outputting 0 based on a determination that no element satisfies the given condition, and
sending one or more values output as 1 to the adder for accumulation.

15. The counting method of claim 12, further comprising:
setting the input data type as a 0/1 vector of a fixed length, wherein the fixed length is denoted as 3l, in which l is an integer greater than 1,
inputting the 0/1 vector of the fixed length of 3l into the adder,
wherein the first layer of the adder includes l full adders,
wherein the second layer of the adder includes $\lceil 2l/3 \rceil$ full adders,
wherein each full adder includes 3 inputs and 2 outputs,
wherein the first layer includes a total of 4l/3 outputs,
wherein adders in the same layer are configured to operate in parallel.

16. The counting method of claim 12, wherein, the counting instruction includes an opcode and one or more operation fields,
wherein the opcode indicates that the instruction is a counting instruction, and the counting circuit is configured to perform a counting computation in accordance with the opcode; and
wherein the operation fields in the counting instruction include address information that indicates the input data to be counted, and/or address information of the given condition.

17. The counting method of claim 12, further comprising:
storing, by the instruction memory, a counting instruction;
acquiring, by the instruction processing circuit, the counting instruction from the instruction memory, and processing the counting instruction;
sequentially storing, by the instruction caching circuit (cache, buffer, or scratch pad), counting instructions to be executed and in execution, the instruction caching circuit being further connected to the counting circuit and the storage circuit for submitting a counting instruction after being executed and a counting result to the storage circuit; and
determining, by the dependency processing circuit, whether input data required for a counting instruction is up-to-date before the counting circuit acquires the counting instruction, and if the counting instruction is up-to-date, providing the counting instruction to the counting circuit directly, if the counting instruction is not up-to-date, storing the counting instruction in a storage queue of the dependency processing circuit, and after the required input data is updated, providing the counting instruction in the storage queue to the counting circuit, wherein
during a process that the counting instruction is sent from the instruction processing circuit to the dependency processing circuit, the counting instruction reads an address of the input data in the storage circuit from the register circuit.

18. The counting method of claim 17, wherein, acquiring, by the instruction processing circuit, the counting instruction from the instruction memory, and processing the counting instruction includes:
acquiring, by the instruction fetching circuit, a counting instruction from the instruction memory,
decoding, by the decoding circuit, the obtained counting instruction, and sequentially storing, by the instruction queue memory, a decoded counting instruction, and sequentially transmitting instructions to the instruction caching circuit and the dependency processing circuit.

* * * * *